United States Patent
Wu et al.

(10) Patent No.: US 9,441,534 B2
(45) Date of Patent: Sep. 13, 2016

(54) COOLED TWO-STAGE TURBOCHARGING SYSTEM

(71) Applicant: GM GLOBAL TECHNOLOGY OPERATIONS LLC, Detroit, MI (US)

(72) Inventors: Ko-Jen Wu, Troy, MI (US); Jason G. Kohler, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 14/510,691

(22) Filed: Oct. 9, 2014

(65) Prior Publication Data

US 2016/0102604 A1    Apr. 14, 2016

(51) Int. Cl.
| | |
|---|---|
| F02B 29/04 | (2006.01) |
| F02B 33/44 | (2006.01) |
| F02D 23/00 | (2006.01) |
| F02B 33/00 | (2006.01) |
| F02B 39/00 | (2006.01) |
| F02B 37/013 | (2006.01) |
| F02B 37/00 | (2006.01) |
| F02B 37/18 | (2006.01) |

(Continued)

(52) U.S. Cl.
CPC ............ F02B 39/005 (2013.01); B60K 11/00 (2013.01); B60K 13/04 (2013.01); F02B 37/001 (2013.01); F02B 37/004 (2013.01); F02B 37/013 (2013.01); F02B 37/18 (2013.01)

(58) Field of Classification Search
CPC .. F02B 39/005; F02B 37/001; F02B 37/004; F02B 37/013; F02B 37/18; B60K 11/00; B60K 11/02; B60K 13/04

USPC ......... 60/612, 602, 599, 320, 321, 323, 324; 123/562; 415/116, 200, 203–204; 180/269, 337, 347, 65.7; 417/406
See application file for complete search history.

(56) References Cited

U.S. PATENT DOCUMENTS

| | | | | | |
|---|---|---|---|---|---|
| 2,866,617 | A | * | 12/1958 | Land ...................... | F01D 25/14 415/205 |
| 3,948,052 | A | * | 4/1976 | Merkle ................... | F01N 3/046 60/321 |

(Continued)

FOREIGN PATENT DOCUMENTS

| | | | | |
|---|---|---|---|---|
| DE | 102012001199 A1 | * | 7/2013 | ............ F02B 37/007 |
| DE | 202014104426 U1 | * | 10/2014 | ............ F02B 39/005 |

(Continued)

*Primary Examiner* — Thai Ba Trieu
(74) *Attorney, Agent, or Firm* — Quinn Law Group, PLLC (57) ABSTRACT

An internal combustion engine includes a cylinder block defining a cylinder, a cylinder head, and an exhaust manifold operatively connected to the cylinder head and configured to exhaust post-combustion gasses from the cylinder. The engine also includes a turbocharging system configured to pressurize an airflow for delivery thereof to the cylinder. The turbocharging system includes a low-flow turbocharger having a first turbine housing and a high-flow turbocharger having a second turbine housing. Each turbocharger is configured to be driven by the post-combustion gasses from the exhaust manifold in order to pressurize the airflow and discharge the pressurized airflow to the cylinder. The turbocharging system also includes a flow control device for selectively directing the post-combustion gasses to the low-flow and high-flow turbochargers. The turbocharging system additionally includes a cooling module configured to cool the second turbine housing. A vehicle employing such an engine is also disclosed.

18 Claims, 4 Drawing Sheets

(51) Int. Cl.
*B60K 13/04* (2006.01)
*B60K 11/00* (2006.01)

(56) References Cited

U.S. PATENT DOCUMENTS

| | | | | |
|---|---|---|---|---|
| 4,068,612 A * | 1/1978 | Meiners | ............... | F01D 25/14 440/89 C |
| 5,463,867 A * | 11/1995 | Ruetz | ............... | F01N 13/102 60/321 |
| 5,519,617 A * | 5/1996 | Hughes | ............... | B60K 28/16 180/197 |
| 6,338,391 B1 * | 1/2002 | Severinsky | ............... | B60K 6/442 180/65.23 |
| 6,513,328 B2 * | 2/2003 | Baeuerle | ............... | F02B 39/005 60/599 |
| 6,553,762 B2 * | 4/2003 | Loffler | ............... | F01D 25/26 415/203 |
| 7,640,744 B2 * | 1/2010 | Rollinger | ............... | F02B 37/00 60/605.1 |
| 8,365,526 B2 * | 2/2013 | Stiermann | ............... | F02B 39/005 60/599 |
| 8,424,372 B2 * | 4/2013 | Sarsen | ............... | F02D 41/18 73/114.32 |
| 9,097,121 B2 * | 8/2015 | Joergl | ............... | F01D 25/12 415/116 |
| 9,217,361 B2 * | 12/2015 | Wu | ............... | F02B 37/007 60/612 |
| 2004/0083730 A1 * | 5/2004 | Wizgall | ............... | F02B 39/005 60/320 |
| 2010/0095671 A1 * | 4/2010 | Takagawa | ............... | F02B 37/18 60/602 |
| 2011/0008158 A1 * | 1/2011 | Boening | ............... | F01D 25/24 415/200 |
| 2011/0252775 A1 * | 10/2011 | Joergl | ............... | F02B 39/005 60/321 |
| 2011/0296834 A1 * | 12/2011 | Kuhlbach | ............... | F01P 7/165 60/605.3 |
| 2012/0055424 A1 * | 3/2012 | Kuhlbach | ............... | F02B 33/44 60/605.3 |
| 2012/0087785 A1 * | 4/2012 | Joergl | ............... | F02B 37/013 415/182.1 |
| 2012/0090320 A1 * | 4/2012 | Kuhlbach | ............... | F02B 37/004 60/611 |
| 2012/0240576 A1 * | 9/2012 | Johnson | ............... | F03G 7/04 60/641.6 |
| 2012/0279291 A1 * | 11/2012 | Sarsen | ............... | F02D 41/18 73/114.32 |
| 2012/0285164 A1 * | 11/2012 | Kuhlbach | ............... | F02B 37/18 60/602 |
| 2012/0321455 A1 * | 12/2012 | Boening | ............... | F01D 25/14 415/208.1 |
| 2013/0031901 A1 * | 2/2013 | Kuhlbach | ............... | F02B 39/005 60/599 |
| 2013/0323020 A1 * | 12/2013 | Bogner | ............... | F02B 39/005 415/116 |
| 2013/0323021 A1 * | 12/2013 | Bogner | ............... | F01D 25/14 415/116 |
| 2015/0034408 A1 * | 2/2015 | Wu | ............... | F02B 37/007 60/612 |
| 2015/0167494 A1 * | 6/2015 | Sumi | ............... | F02B 39/005 415/178 |
| 2015/0176429 A1 * | 6/2015 | Oki | ............... | F02B 39/005 415/175 |
| 2016/0010594 A1 * | 1/2016 | Wu | ............... | F02M 25/071 60/602 |

FOREIGN PATENT DOCUMENTS

| | | | |
|---|---|---|---|
| JP | 60212617 A | * | 10/1985 |
| JP | 2013002361 A | * | 1/2013 |

* cited by examiner

COOLED TWO-STAGE TURBOCHARGING SYSTEM

TECHNICAL FIELD

The present disclosure relates to a cooled two-stage turbocharging system for an internal combustion engine.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

In an effort to increase overall engine efficiency and response, some ICE's employ two-stage turbocharging systems which include a smaller turbocharger driven by lower exhaust flows and a larger turbocharger driven by higher exhaust flows. A transition between the two turbochargers in such a two-stage system is typically controlled based on the particular engine's configuration and operating requirements.

At higher engine speeds and loads, temperatures of engine exhaust gas generally become elevated. As a result, turbochargers frequently experience substantial thermal stresses that may require implementation of structural reinforcements and high-temperature materials to ensure reliable turbocharger operation.

SUMMARY

One embodiment of the disclosure is directed to an internal combustion engine that includes a cylinder block. The cylinder block defines a cylinder and a cylinder head mounted to the cylinder block. The cylinder head is configured to supply air and fuel to the cylinder for combustion therein. The engine also includes an exhaust manifold operatively connected to the cylinder head and configured to exhaust post-combustion gasses from the cylinder. A turbocharging system of the engine is configured to pressurize an airflow for delivery to the cylinder.

The turbocharging system includes a low-flow turbocharger having a first turbine housing and a high-flow turbocharger having a second turbine housing. Each of the low-flow and high-flow turbochargers is configured to be driven by the post-combustion gasses from the exhaust manifold to pressurize the airflow and discharge the pressurized airflow to the cylinder. The turbocharging system also includes a flow control device for selectively directing the post-combustion gasses to the low-flow and high-flow turbochargers. The turbocharging system additionally includes a cooling module configured to cool the second turbine housing.

The engine may define a coolant passage and the cooling module may define a coolant jacket in fluid communication with the coolant passage.

The exhaust manifold may include a single outlet in fluid communication with the turbocharging system. Additionally, each of the first turbine housing and the second turbine housing may include an inlet and an outlet, the single outlet of the exhaust manifold may be in fluid communication with the inlet of the first turbine housing, and the outlet of the first turbine housing may be in fluid communication with the inlet of the second turbine housing. The turbocharging system may additionally include a bypass controlled by the flow control device and configured to selectively route the post-combustion gasses to the inlet of the first turbine housing and to the inlet of the second turbine housing. In such a case, the cooling module may be configured to cool the bypass.

The first turbine housing and the second turbine housing may be combined into a single turbine housing assembly. In such a case, the flow control device may be incorporated into the turbine housing assembly, and the cooling module may be configured to cool the inlet of the first turbine housing, the inlet of the second turbine housing, and the flow control device.

The cooling module may include an exhaust flow passage. The coolant jacket may be configured to cool the exhaust flow passage. The cooling module may be a cast component and the coolant jacket may then be cast into the cooling module.

The cooling module may be incorporated into the inlet of the second turbine housing.

The cooling module may include a coolant inlet and a coolant outlet. Each of the coolant inlet and the coolant outlet may be in fluid communication with the coolant passage in the engine.

The exhaust manifold may include a first outlet and a second outlet. Each of the first and second outlets of the exhaust manifold may be configured to exhaust post-combustion gasses from the cylinder. The low-flow turbocharger may be configured to be driven by the post-combustion gasses from the first outlet, while the high-flow turbocharger may be configured to be driven by the post-combustion gasses from the second outlet. The flow control device may be attached directly to and be in fluid communication with the second outlet. Furthermore, the cooling module may circulate coolant around the flow control device.

The cooling module may also be incorporated into the flow control device.

The engine may also include a programmable controller configured to regulate operation of the flow control device. In such a case, the controller may be programmed to close the flow control device to direct the post-combustion gasses to the low-flow turbocharger and open the flow control device to direct the post-combustion gasses to the high-flow turbocharger. The controller may also be programmed to close the flow control device below a predetermined flow rate of the post-combustion gas and open the flow control device at or above the predetermined flow rate. Additionally, the controller may be programmed to regulate operation of the cooling module via a fluid valve.

The exhaust manifold may be integrated into the cylinder head. Additionally, the cylinder head may be integrated into or cast together with the cylinder block.

Another embodiment of the present disclosure is directed to a vehicle employing the engine as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
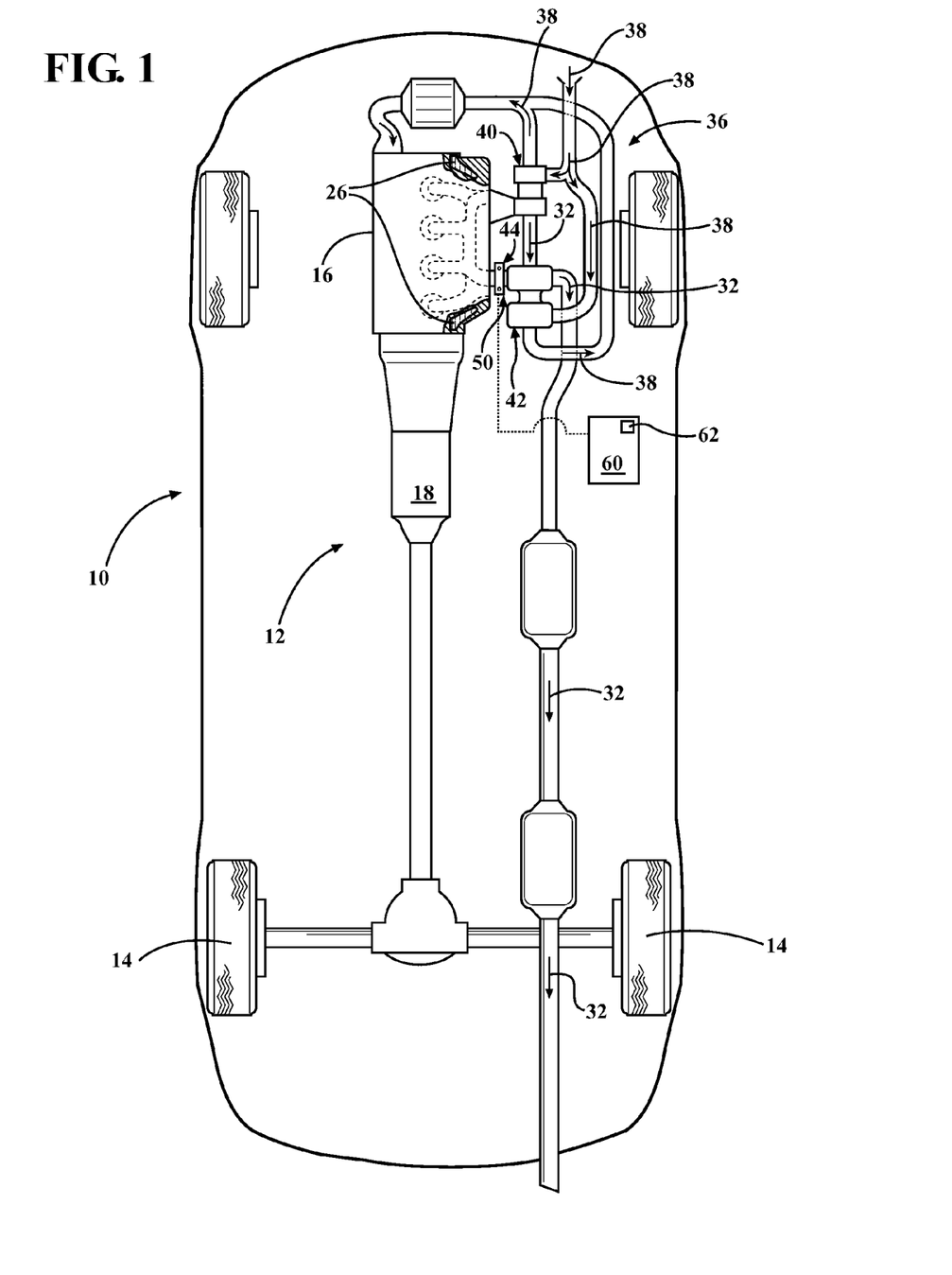
FIG. 1 is a schematic depiction of a vehicle having an engine with a two-stage turbocharging system employing a cooling module according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may also include one or more electric motor/generators, none of which are shown, but the existence of which may be envisioned by those skilled in the art.

Figure 2:
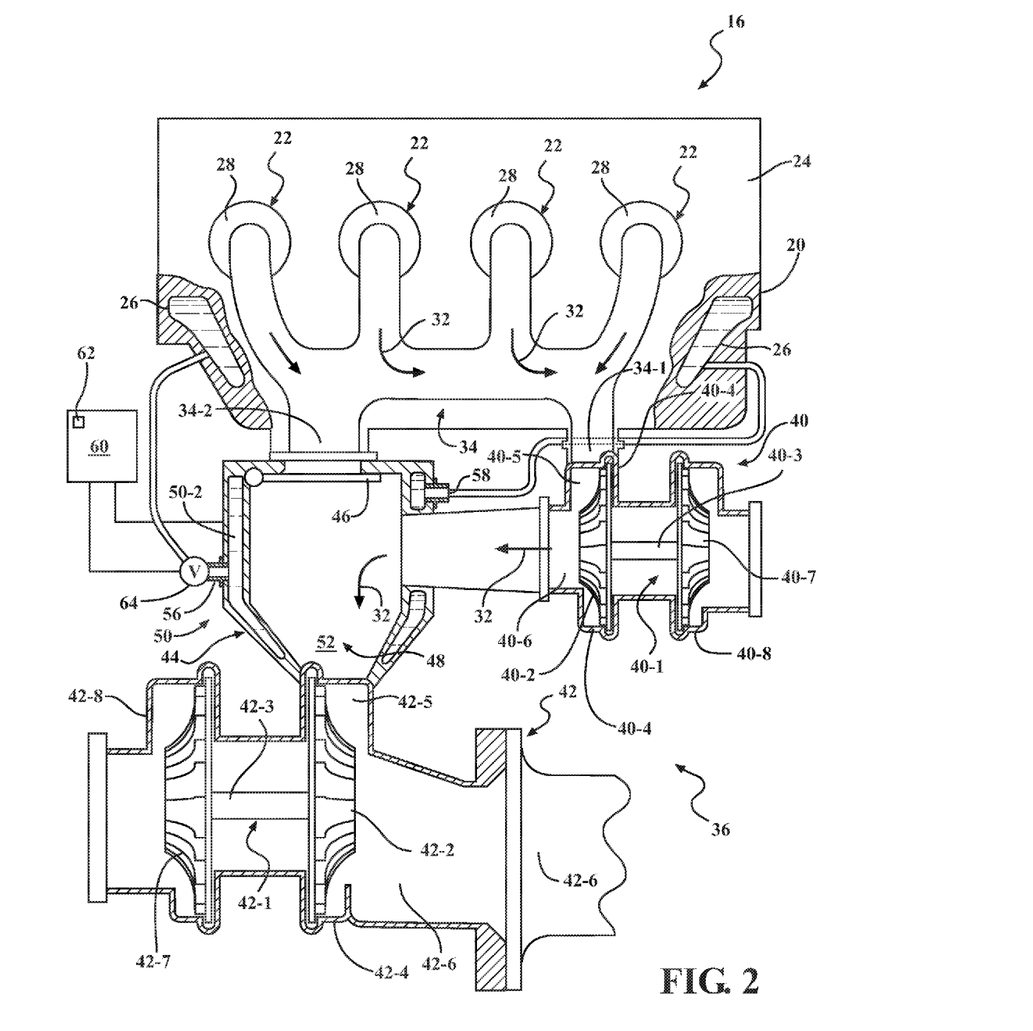
FIG. 2 is a schematic partially cross-sectional top view of an engine with the two-stage turbocharging system shown in FIG. 1 according to one embodiment of the disclosure, illustrating a flow control device in an open state.
Figure 3:
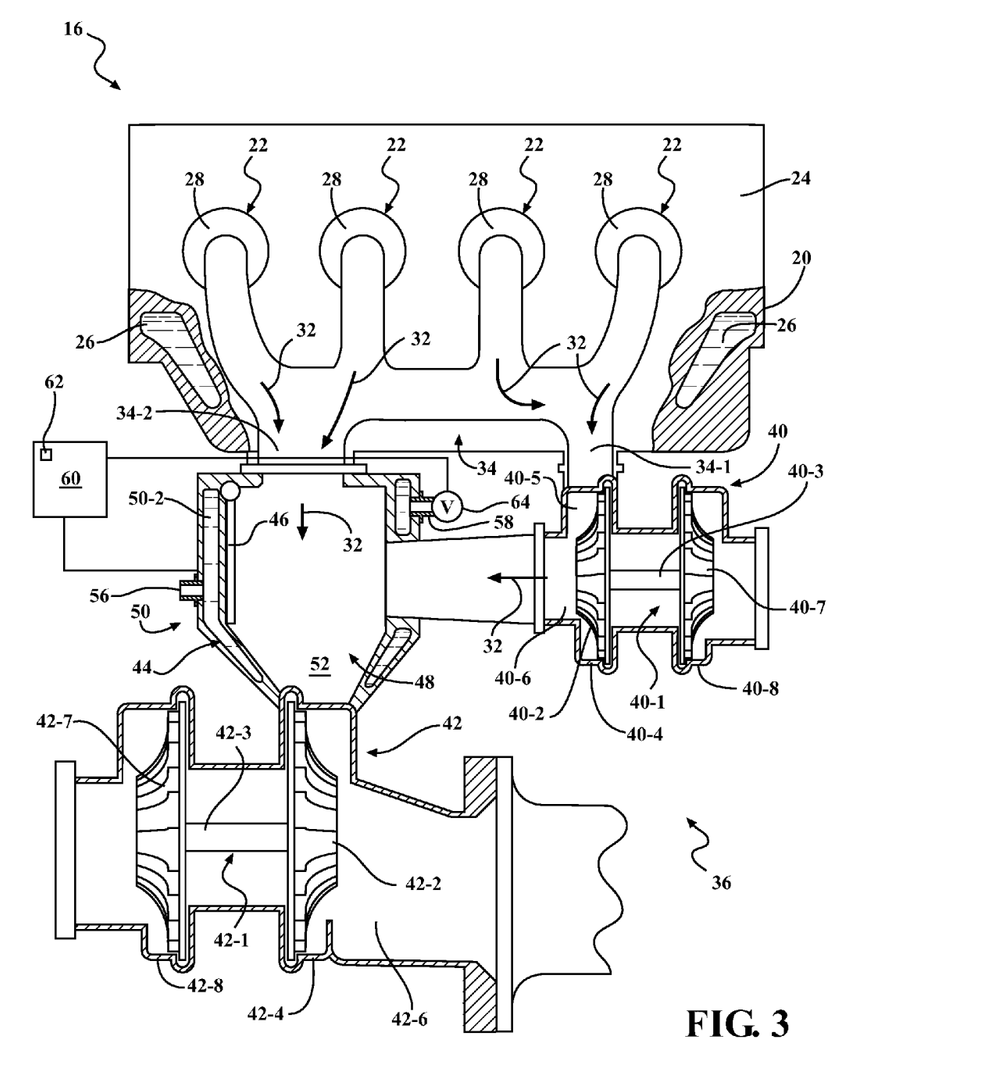
FIG. 3 is a schematic partially cross-sectional top view of the engine with the two-stage turbocharging system according to the embodiment shown in FIG. 2, illustrating the flow control device in a closed state.
Figure 4:
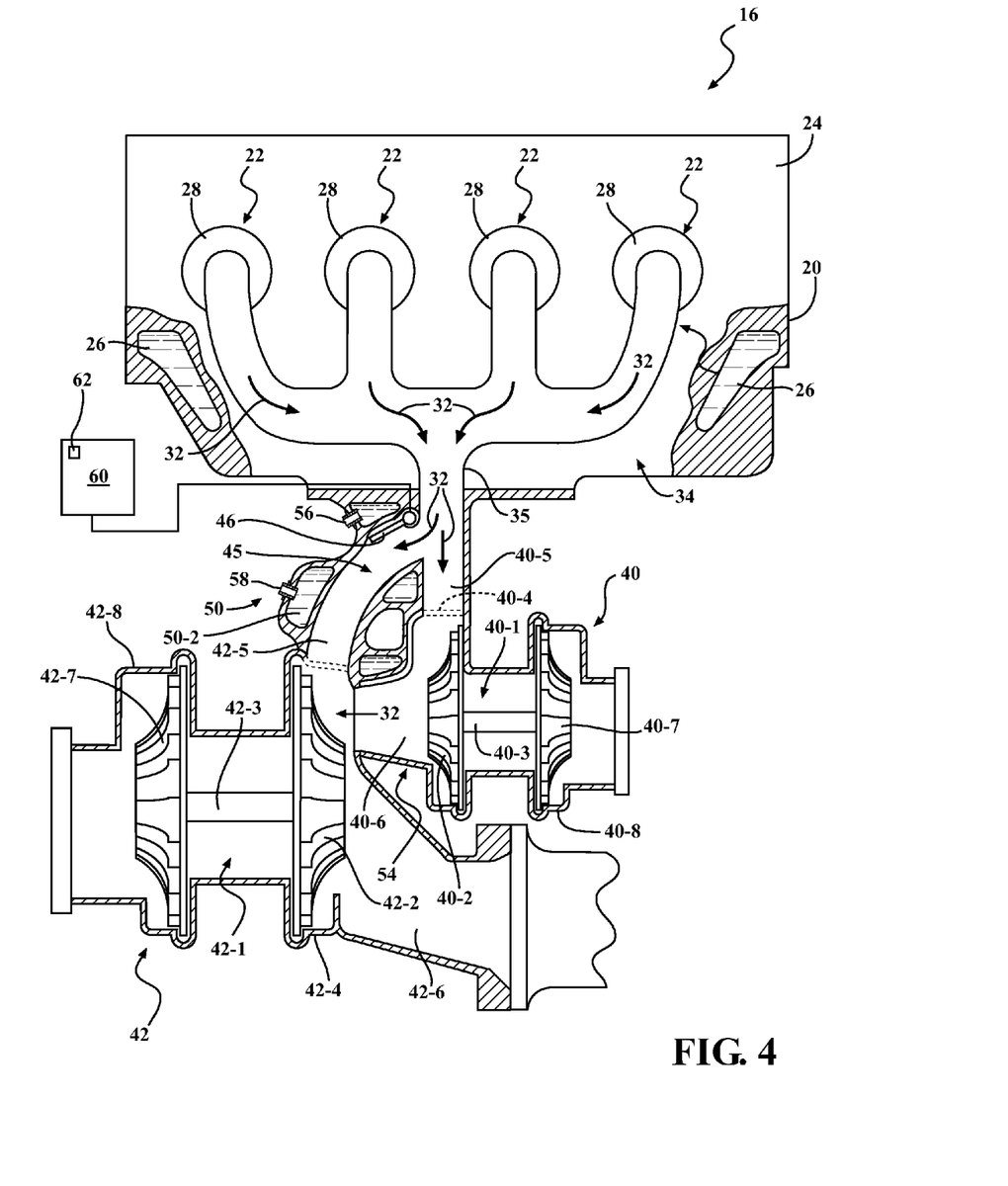
FIG. 4 is a schematic partially cross-sectional top view of the engine with the two-stage turbocharging system shown in FIG. 1 according to another embodiment of the disclosure.

As shown in FIG. 2, the engine 16 includes a cylinder block 20 with a plurality of cylinders 22 arranged therein and a cylinder head 24 that is mounted on the cylinder block. As shown in FIGS. 2-4, the cylinder head 24 may be integrated into or cast together with the cylinder block 20. The cylinder head 24 receives air and fuel to be used inside the cylinders 22 for subsequent combustion. Each cylinder 22 includes a piston, which is not specifically shown, but known to those skilled in the art to reciprocate therein. The engine 16 also defines a coolant passage 26 configured to circulate a specially formulated engine coolant throughout the cylinder block 20 and/or the cylinder head 24. Combustion chambers 28 are formed within the cylinders 22 between the bottom surface of the cylinder head 24 and the tops of the pistons. As known by those skilled in the art, each of the combustion chambers 28 receives fuel and air from the cylinder head 24 that form a fuel-air mixture for subsequent combustion inside the subject combustion chamber. Although an in-line four-cylinder engine is shown, nothing precludes the present disclosure from being applied to an engine having a different number and/or arrangement of cylinders.

The engine 10 also includes a crankshaft (not shown) configured to rotate within the cylinder block 20. As known to those skilled in the art, the crankshaft is rotated by the pistons as a result of an appropriately proportioned fuel-air mixture being burned in the combustion chambers 28. After the air-fuel mixture is burned inside a specific combustion chamber 28, the reciprocating motion of a particular piston serves to exhaust post-combustion gasses 32 from the respective cylinder 22. The cylinder head 24 is also configured to exhaust post-combustion gasses 32 from the combustion chambers 28 via an exhaust manifold 34. As shown in the Figures, the exhaust manifold 34 may be internally cast, i.e., integrated, into the cylinder head 24, or be configured as a separate, attachable component for scavenging the exhaust post-combustion gasses 32 from the cylinders 22. According to one embodiment (shown in FIGS. 2-3), exhaust runners from different cylinders 22 may be grouped in the exhaust manifold 34 into two separate outlets, a first outlet 34-1 and a second outlet 34-2. In a different embodiment (shown in FIG. 4), exhaust runners from different cylinders 22 may converge in the exhaust manifold 34 into a single outlet 35.

The engine 10 also includes a turbocharging system 36 configured to develop boost pressure, i.e., pressurize an airflow 38 that is received from the ambient, for delivery to the cylinders 22. The turbocharging system 36 is configured as a two-stage forced induction arrangement for the engine 10. The turbocharging system 36 includes a low-flow turbocharger 40 and a high-flow turbocharger 42. Each of the low-flow and high-flow turbochargers 40, 42 is in fluid communication with the exhaust manifold 34 and configured to be driven by the post-combustion gasses 32 therefrom. The low-flow turbocharger 40 may be driven by the post-combustion gasses 32 from the first outlet 34-1, while the high-flow turbocharger 42 may be driven by the post-combustion gasses from the second outlet 34-2. In the alternative, each of the low-flow turbocharger 40 and the high-flow turbocharger 42 may be driven by the post-combustion gasses 32 from the single outlet 35.

The low-flow turbocharger 40 pressurizes and discharges the airflow 38 to the cylinders 22 at lower flow rates of the post-combustion gasses 32, which are typically generated at lower rotational speeds, such as below approximately 3,000 RPM, of the engine 10. The high-flow turbocharger 42 pressurizes and discharges the airflow 38 to the cylinders 22 at higher flow rates of the post-combustion gasses 32, which are typically generated at intermediate and higher rotational speeds, such as around 3,000 RPM and above, of the engine 10. To support such distinct engine speed ranges and rates of airflow 38, the low-flow turbocharger 40 is typically sized comparatively smaller and thus has a smaller rotating inertia than the high-flow turbocharger 42. As such, the exhaust manifold 34 is operatively connected to the cylinder head 24, and in the case of the exhaust manifold 34 having two separate outlets 34-1, 34-2, the two turbochargers 40, 42 can be mounted generally apart. In the case where both the low-flow and high-flow turbochargers 40, 42 are driven from the single outlet 35, the two turbochargers employ a shared exhaust inlet, as will be described in detail below, and, as a result, are arranged in closer proximity relative to one another.

Generally, in a two-stage forced induction arrangement the output pressure from multiple turbochargers is greater than can be provided by a single turbocharger. Such a two-stage forced induction arrangement may be configured to operate as a sequential system, wherein at least in some, typically higher, engine speed ranges both low- and high-flow turbochargers operate simultaneously, i.e., with operational overlap. A two-stage forced induction arrangement may also be configured to generate boost pressure as a staged system, i.e., where the low- and high-flow turbochargers generate boost pressure in sequence, without any operational overlap. In such two-stage forced induction arrangements, the first, larger flow turbocharger boosts intake air pressure as much as possible, for example to three times the intake pressure, and the subsequent smaller flow turbocharger(s) takes the intake air charge from the previous stage and compresses it further, for example to an additional three times intake pressure, for a total boost of nine times atmospheric pressure.

As shown in FIGS. 2-4, each of the turbochargers 40 and 42 includes a rotating assembly, rotating assembly 40-1 and rotating assembly 42-1, respectively. The rotating assemblies 40-1 and 42-1 include respective turbine wheels 40-2 and 42-2 mounted on shafts 40-3 and 42-3, respectively. The turbine wheels 40-2 and 42-2 are configured to be rotated along with the respective shafts 40-3, 42-3 by post-combustion gasses 32 emitted from the cylinders 22. The rotating assembly 42-1 is physically larger than rotating assembly 40-1 such that the high-flow turbocharger 42 may generate the comparatively higher air flow rates required therefrom. The turbine wheels 40-2 and 42-2 are typically constructed from a temperature and oxidation resistant material, such as a nickel-chromium-based "inconel" super-alloy to reliably withstand temperatures of the post-combustion gasses 32.

The turbine wheels 40-2 and 42-2 are disposed inside a respective first or low-flow turbine housing 40-4 and a second or high-flow turbine housing 42-4, that are typically constructed from cast iron or steel. The turbine housings 40-4, 42-4 include appropriately configured, i.e., designed and sized, respective turbine volutes or scrolls. The turbine scrolls of the turbine housings 40-4 and 42-4 receive the post-combustion gasses 32 and direct the gasses to the respective turbine wheels 40-2 and 42-2. The turbine scrolls are configured to achieve specific performance characteristics, such as efficiency and response, of the respective turbocharger 40 and 42. Because the low-flow turbocharger 40 receives post-combustion gasses 32 at lower engine speeds and loads, the temperature of the post-combustion gasses entering the turbine housing 40-4 is typically below 1,560 degrees Fahrenheit. On the other hand, at higher speeds and loads the temperature of the post-combustion gasses 32 entering the turbine housing 42-4 may approach and even exceed 2,000 degrees Fahrenheit. Each of the first turbine housing 40-4 and the second turbine housing 42-4 includes a respective inlet 40-5, 42-5 and a respective outlet 40-6, 42-6. Each of the first and second turbine housings 40-4, 42-4 may also include an integrated waste-gate valve (not shown) to facilitate more precise control over boost pressures generated by the turbocharging system 36, as well as the transition and overlap between operation of the low-flow turbocharger 40 and the high-flow turbocharger 42. However, a flow control device 44 that is described in detail below may serve as a waste-gate for the low-flow turbocharger 40.

Each rotating assembly 40-1, 42-1 also includes a compressor wheel 40-7 and 42-7 mounted on the respective shaft 40-3, 42-3. The compressor wheels 40-7 and 42-7 are configured to pressurize the airflow 38 being received from the ambient for eventual delivery to the cylinders 22. The compressor wheels 40-7 and 42-7 are disposed inside a respective compressor cover 40-8 and 42-8. Each compressor cover 40-8, 42-8 is typically constructed from aluminum and includes a respective compressor volute or scroll. As understood by those skilled in the art, the variable flow and force of the post-combustion gasses 32 influences the amount of boost pressure that may be generated by each compressor wheel 40-7 and 42-7 of the respective turbochargers 40 and 42 throughout the operating range of the engine 16. Each compressor wheel 40-7, 42-7 is typically formed from a high-strength aluminum alloy that provides the compressor wheel with reduced rotating inertia and quicker spin-up response.

The engine 16 additionally includes an induction system that may include an air duct and an air filter upstream of the turbochargers 40, 42 configured to channel the airflow 38 from the ambient to the turbocharging system 36. Although the induction system is not shown, the existence of such would be appreciated by those skilled in the art. Each of the turbochargers 40, 42 may also be fluidly connected to an intake manifold (not shown) that is configured to distribute the pressurized airflow 38 to each of the cylinders 22 for mixing with an appropriate amount of fuel and subsequent combustion of the resultant fuel-air mixture.

As shown in FIGS. 2-4, the turbocharging system 36 also includes a flow control device 44. The flow control device 44 is configured to selectively direct the post-combustion gasses 32 to the low-flow turbocharger 40 and the high-flow turbocharger 42. In the embodiment employing the exhaust manifold 34 with the first outlet 34-1 and the second outlet 34-2, the flow control device 44 may be mounted directly to and be in fluid communication with the second outlet 34-2 (shown in FIGS. 2-3). The high-flow turbocharger 42 is then mounted to the flow control device 44 and apart from the low-flow turbocharger 40, such that the post-combustion gasses 32 may only access the high-flow turbocharger by first passing through the flow control device. A fluid flow path out of the first manifold outlet 34-1 is maintained unobstructed so as to supply the post-combustion gasses 32 to the low-flow turbocharger 40, while another fluid flow path from the second manifold outlet 34-2 is connected to the flow control device 44. In the alternative embodiment where the exhaust manifold 34 converges at the single outlet 35, the manifold outlet 35 is in fluid communication with the inlet 40-5 of the first turbine housing 40-4, and the outlet 40-6 of the first turbine housing is in fluid communication with the inlet 42-5 of the second turbine housing 42-4. The embodiment of the turbocharging system 36 employing the exhaust manifold 34 with the single outlet 35 may also include a bypass 45 controlled by the flow control device 44 and configured to selectively route the post-combustion gasses 32 to the inlet 40-5 of the first turbine housing 40-4 and to the inlet 42-5 of the second turbine housing 42-4 (shown in FIG. 4).

The flow control device 44 includes a valve 46 and a chamber 48, and is used to selectively open and close the fluid flow path from the second manifold outlet 34-2 into the high-flow turbocharger 42. The flow control device 44 is also open, i.e., fluidly connected with the first turbine housing 40-4. As shown, the valve 46 may be configured as a pivotable door designed to selectively open and close the flow control device 44. When the flow control device 44 is closed and the valve 46 blocks the second manifold outlet 34-2, the post-combustion gasses 32 naturally flow into the low-flow turbocharger 40. Following the low-flow turbocharger 40, the post-combustion gas 32 is exited from the first turbine housing 40-4 into the second turbine housing 42-4 downstream of the valve 46. On the other hand, because the chamber 48 is fluidly connected to the low-flow turbine, when the valve 46 fully opens the second manifold outlet 34-2, pressure across the two sides of the first turbine housing 40-4 equalizes and the post-combustion gasses 32 will naturally flow into the second turbine housing 42-4.

The valve 46 can be sized in order to select the operational transition point between the low-flow turbine wheel 40-2 and the high-flow turbine wheel 42-2. Also, opening of the flow control device 44 may be modulated via the valve 46 to adjust or vary the flow of post-combustion gasses 32 through the first turbine housing 40-4, thus varying the amount of overlap between operation of the low- and high-flow turbochargers 40, 42. Also, the relative sizes of the first and second turbine housings 40-4, 42-4 are selected to vary the operation transition point between low-flow turbine wheel 40-2 and high-flow turbine wheel 42-2. Accordingly, the opening of the chamber 48 of the valve 46 can also be controlled to effect sequential operation of the two turbochargers 40, 42. Through such an arrangement, the flow control device 44 is configured to selectively direct the post-combustion gas 32 to the low-flow turbocharger 40 and the high-flow turbocharger 42, thus effectively transitioning between the low-flow turbocharger and the high-flow turbocharger during operation of the engine 16.

The turbocharging system 36 also includes a cooling module 50. The cooling module 50 is operatively connected to the second turbine housing 42-4 to circulate the engine coolant proximately to the second turbine housing. The cooling module 50 removes heat energy from the post-combustion gasses 32 prior to the heat energy soaking into the second turbine housing 42-4 in order to reduce operating temperature of the second turbine housing. The cooling module 50 may define a coolant jacket 50-2 that is in fluid communication with the coolant passage 26 of the engine 16, as shown in FIG. 2. The cooling module 50 may be a cast component and the coolant jacket 50-2 may then be cast into the cooling module. The cooling module 50 also includes an exhaust flow passage 52 and the coolant jacket 50-2 generally surrounds, i.e., is proximate to and at least partially wraps around, the exhaust flow passage in order to cool the post-combustion gasses 32 flowing therethrough. The cooling module 50 may also be incorporated, such as cast, into the inlet 42-5 of the second turbine housing 42-4 in order to remove the heat energy from the post-combustion gasses 32 at the entry to the second turbine housing 42-4. Thus, with the cooling module 50 incorporated into the inlet 42-5, the operating temperature of the second turbine 42-4 housing may be reduced.

As shown in FIG. 4, in the embodiment of the turbocharging system 36 employing the exhaust manifold 34 with the single outlet 35, the first turbine housing 40-4 and the second turbine housing 42-4 may be combined into a single turbine housing assembly 54. Additionally, the flow control device 44 may be incorporated into the turbine housing assembly 54 by being arranged between the first turbine housing 40-4 and the second turbine housing 42-4. Accordingly, in the turbine housing assembly 54, the cooling module 50 is configured to cool the inlet 40-5 of the first turbine housing, the inlet 42-5 of the second turbine housing 42-4, as well as the flow control device 44. The cooling module 50 may also circulate engine coolant around the flow control device 44, and thereby cool the post-combustion gasses 32 prior to the heat energy borne by the post-combustion gasses accessing the second turbine housing 42-4. Additionally, as shown in FIGS. 2-3, the cooling module 50 may be incorporated into the flow control device 44, for example the coolant jacket 50-2 may be at least partially cast into the flow control device, as shown in FIGS. 2-3. In the embodiment of FIGS. 2-3, the cooling module 50 would thus be arranged between the outlet 40-6 of the first turbine housing 40-4 and the inlet 42-5 of the second turbine housing 42-4. Furthermore, in the embodiment employing the exhaust manifold 34 with the single outlet 35 and the bypass 45, the coolant jacket 50-2 of the cooling module 50 may be incorporated into the turbine housing assembly 54 to cool the bypass, as shown in FIG. 4.

As shown in FIGS. 2-4, the cooling module 50 includes a coolant inlet 56 and a coolant outlet 58. Each of the coolant inlet 56 and the coolant outlet 58 is in fluid communication with the coolant passage 26 in the engine 16, as shown in FIG. 2. Accordingly, the engine coolant is consistently circulated through the cooling module 50 via the coolant passage 26 to the coolant inlet 56 and back to the coolant passage 26 via the coolant outlet 58. Such coolant circulation ensures that during operation of the turbocharging system 36, heat energy from the post-combustion gasses 32 is continuously removed to reduce operating temperature of the second turbine 42-4 housing.

The vehicle 10 may additionally include a programmable controller 60 configured to regulate operation of the engine 16, such as by controlling an amount of fuel being injected into the cylinders 22 for mixing and subsequent combustion with the pressurized airflow 38. The controller 60 is also configured to regulate the flow control device 44. More particularly, the controller 60 is programmed to close the flow control device 44 (as shown in FIG. 2) to direct the post-combustion gasses 32 to the low-flow turbocharger 40 and open the flow control device (as shown in FIG. 3) to direct the post-combustion gasses to the high-flow turbocharger 42 depending on operating parameters, such as the load, temperature, and rotational speed, of the engine 16. Accordingly, the controller 60 may be programmed to close the flow control device 44 below a predetermined flow rate 62 of the post-combustion gasses 32 and open the flow control device at or above the predetermined flow rate.

In general, the controller 60 may be a dedicated controller for the engine 16, a controller for the powertrain 12, or a central processing unit for the entire vehicle 10. The controller 60 includes a memory, at least some of which is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 60 may also include a floppy disk, a flexible disk, hard disk, magnetic tape, any other magnetic medium, a CD-ROM, DVD, any other optical medium, etc. The controller 60 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 60 or accessible thereby may be stored in the memory and automatically executed to provide the required functionality.

The predetermined flow rate 62 of the post-combustion gasses 32 may be a specific flow rate value below which the post-combustion gasses of the subject engine 16 have sufficient energy to spin the low-flow turbocharger 40 up at a desired rate in order to provide the desired boost pressure within a desired timeframe, but insufficient to similarly spin up the higher inertia high-flow turbocharger 42. The subject predetermined flow rate 62 of the post-combustion gasses 32 may be identified through calculations and then verified through an empirical procedure during testing of the actual engine 16, both on a test stand and in the vehicle 10. The controller 60 may also be configured to regulate the circulation of the coolant from the coolant passage 26 through the cooling module 50 in response to the duty cycle of the flow control device 44, the turbocharging system 36, and the general operation of the engine 16. Such regulation of the coolant circulation may be accomplished via a fluid valve 64 arranged in the cooling module 50, such as at the coolant inlet 56 (shown in FIG. 2) or at the coolant outlet 58 (shown in FIG. 3), and in operative communication with the controller 60.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
 a cylinder block defining a cylinder;
 a cylinder head mounted to the cylinder block and configured to supply air and fuel to the cylinder for combustion therein;
 an exhaust manifold operatively connected to the cylinder head and configured to exhaust post-combustion gasses from the cylinder;
 a turbocharging system configured to pressurize an airflow being received from the ambient for delivery to the cylinder, the turbocharging system including:
  a low-flow turbocharger having a first turbine housing and configured to be driven by the post-combustion gasses from the exhaust manifold, to pressurize the airflow, and to discharge the pressurized airflow to the cylinder;
  a high-flow turbocharger having a second turbine housing and configured to be driven by the post-combustion gasses from the exhaust manifold, to pressurize the airflow, and to discharge the pressurized airflow to the cylinder;
  a flow control device configured to selectively direct the post-combustion gasses to the low-flow turbocharger and the high-flow turbocharger; and
  a cooling module configured to cool the second turbine housing; and
 a programmable controller configured to regulate operation of the flow control device, wherein the controller is programmed to:
  close the flow control device to direct the post-combustion gasses to the low-flow turbocharger and open the flow control device to direct the post-combustion gasses to the high-flow turbocharger;
  close the flow control device below a predetermined flow rate of the post-combustion gas and open the flow control device at or above the predetermined flow rate; and
  regulate operation of the cooling module via a fluid valve.

2. The engine of claim 1, wherein the engine defines a coolant passage and the cooling module defines a coolant jacket in fluid communication with the coolant passage.

3. The engine of claim 2, wherein the cooling module includes an exhaust flow passage and the coolant jacket is configured to cool the exhaust flow.

4. The engine of claim 2, wherein the cooling module includes a coolant inlet and a coolant outlet, and wherein each of the coolant inlet and the coolant outlet is in fluid communication with the coolant passage in the engine.

5. The engine of claim 1, wherein:
 the exhaust manifold includes a single outlet in fluid communication with the turbocharging system;
 each of the first turbine housing and the second turbine housing includes an inlet and an outlet, the single outlet of the exhaust manifold is in fluid communication with the inlet of the first turbine housing, and the outlet of the first turbine housing is in fluid communication with the inlet of the second turbine housing;
 the turbocharging system includes a bypass controlled by the flow control device and configured to selectively route the post-combustion gasses to the inlet of the first turbine housing and to the inlet of the second turbine housing; and
 the cooling module is configured to cool the bypass.

6. The engine of claim 5, wherein the first turbine housing and the second turbine housing are combined into a single turbine housing assembly, the flow control device is incorporated into the turbine housing assembly, and the cooling module is configured to cool the inlet of the first turbine housing, the inlet of the second turbine housing, and the flow control device.

7. The engine of claim 1, wherein:
 the exhaust manifold includes a first outlet and a second outlet;
 each of the first and second outlets is configured to exhaust post-combustion gasses from the cylinder;
 the low-flow turbocharger is configured to be driven by the post-combustion gasses from the first outlet;
 the high-flow turbocharger is configured to be driven by the post-combustion gasses from the second outlet;
 the flow control device is attached directly to and is in fluid communication with the second outlet; and
 the cooling module circulates coolant around the flow control device.

8. The engine of claim 7, wherein the cooling module is incorporated into the flow control device.

9. The engine of claim 1, wherein the cooling module is incorporated into the inlet of the second turbine housing.

10. A vehicle comprising:
 a driven wheel; and
 a powertrain including an internal combustion engine and a transmission assembly operatively connected to the engine and configured to transmit engine torque to the driven wheel, the engine including:
  a cylinder block defining a cylinder;
  a cylinder head mounted to the cylinder block and configured to supply air and fuel to the cylinder for combustion therein;
  an exhaust manifold operatively connected to the cylinder head and configured to exhaust post-combustion gasses from the cylinder;
  a turbocharging system configured to pressurize an airflow being received from the ambient for delivery to the cylinder, the turbocharging system including:
   a low-flow turbocharger having a first turbine housing and configured to be driven by the post-combustion gasses from the exhaust manifold, to pressurize the airflow, and to discharge the pressurized airflow to the cylinder;

a high-flow turbocharger having a second turbine housing and configured to be driven by the post-combustion gasses from the exhaust manifold, to pressurize the airflow, and to discharge the pressurized airflow to the cylinder;

a flow control device configured to selectively direct the post-combustion gasses to the low-flow turbocharger and the high-flow turbocharger; and a cooling module configured to cool the second turbine housing; and a programmable controller configured to regulate operation of the flow control device, wherein the controller is programmed to:

close the flow control device to direct the post-combustion gasses to the low-flow turbocharger and open the flow control device to direct the post-combustion gasses to the high-flow turbocharger;

close the flow control device below a predetermined flow rate of the post-combustion gas and open the flow control device at or above the predetermined flow rate; and regulate operation of the cooling module via a fluid valve.

11. The vehicle of claim 10, wherein the engine defines a coolant passage and the cooling module defines a coolant jacket in fluid communication with the coolant passage.

12. The vehicle of claim 11, wherein the cooling module includes an exhaust flow passage and the coolant jacket is configured to cool the exhaust flow passage.

13. The vehicle of claim 11, wherein the cooling module includes a coolant inlet and a coolant outlet, and wherein each of the coolant inlet and the coolant outlet is in fluid communication with the coolant passage in the engine.

14. The vehicle of claim 10, wherein:

the exhaust manifold includes a single outlet in fluid communication with the turbocharging system;

each of the first turbine housing and the second turbine housing includes an inlet and an outlet, the single outlet of the exhaust manifold is in fluid communication with the inlet of the first turbine housing, and the outlet of the first turbine housing is in fluid communication with the inlet of the second turbine housing;

the turbocharging system includes a bypass controlled by the flow control device and configured to selectively route the post-combustion gasses to the inlet of the first turbine housing and to the inlet of the second turbine housing; and the cooling module is configured to cool the bypass.

15. The vehicle of claim 14, wherein the first turbine housing and the second turbine housing are combined into a single turbine housing assembly, the flow control device is incorporated into the turbine housing assembly, and the cooling module is configured to cool the inlet of the first turbine housing, the inlet of the second turbine housing, and the flow control device.

16. The vehicle of claim 10, wherein:

the exhaust manifold includes a first outlet and a second outlet;

each of the first and second outlets is configured to exhaust post-combustion gasses from the cylinder;

the low-flow turbocharger is configured to be driven by the post-combustion gasses from the first outlet;

the high-flow turbocharger is configured to be driven by the post-combustion gasses from the second outlet;

the flow control device is attached directly to and is in fluid communication with the second outlet; and the cooling module circulates coolant around the flow control device.

17. The vehicle of claim 16, wherein the cooling module is incorporated into the flow control device.

18. The vehicle of claim 10, wherein the cooling module is incorporated into the inlet of the second turbine housing.

\* \* \* \* \*